United States Patent [19]  
Ladwig

[11] 4,188,186  
[45] Feb. 12, 1980

[54] AUTOMATIC CALCINING KETTLE

[75] Inventor: Richard D. Ladwig, Salina, Kans.

[73] Assignee: Combustion Engineering, Inc., Windsor, Conn.

[21] Appl. No.: 918,140

[22] Filed: Jun. 22, 1978

[51] Int. Cl.² ............................................. F27B 9/40
[52] U.S. Cl. ...................................... 432/43; 34/179; 432/151
[58] Field of Search .................. 432/43, 151; 137/386, 137/395; 34/179

[56] References Cited

U.S. PATENT DOCUMENTS

| 2,913,901 | 11/1959 | Moen | 137/395 X |
| 3,307,840 | 3/1967 | Conroy, Jr. | 432/151 X |
| 3,485,262 | 12/1969 | Perren | 137/386 |
| 4,113,836 | 9/1978 | O'Connor | 432/151 |

Primary Examiner—John J. Camby  
Attorney, Agent, or Firm—Arthur L. Wade

[57] ABSTRACT

A vessel is mounted above a furnace, and is used for retaining gypsum as it is calcined to prepare it for making wallboard or plaster. A feed of crushed gypsum supplies the vessel-kettle regulated by the temperature required to calcine gypsum. Calcined gypsum flows from the kettle while maintaining a predetermined level of gypsum in the kettle.

5 Claims, 1 Drawing Figure

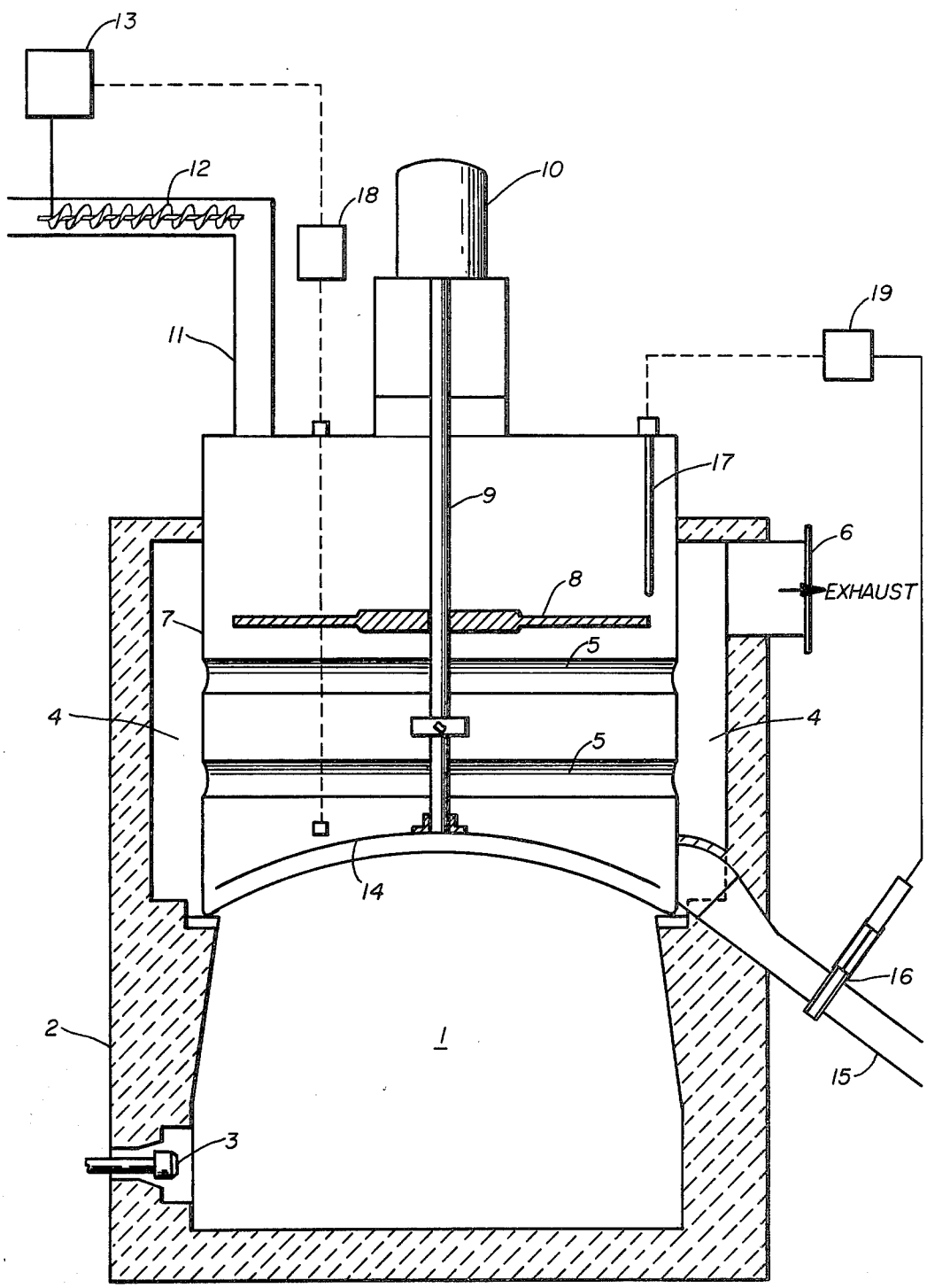

AUTOMATIC CALCINING KETTLE

BACKGROUND OF THE INVENTION

1. Field of the Invention

This invention relates to the automatic control of both feed to a gypsum calcining kettle and discharge of calcined gypsum from the kettle. More specifically, the invention relates to controlling the feed to the kettle by the temperature of the finished product and discharge of the finished product from the kettle, at a rate maintaining a predetermined level of the gypsum in the kettle.

2. Prior Art

The gypsum wallboard industry is energy intensive. It is well established that 3,000 BTU per square foot of wallboard is required. Many plants with a speed of 150 fpm manufacture approximately 36,000 square feet per hour, which requires an energy consumption up to 108,000,000 BTU/hr. About two-thirds of the heat requirement is used in the wallboard plant, the other one-third (36,000,000 BTU/hr.) is used in the gypsum calcining (stucco or plaster) mill.

It is common practice to calcine gypsum on a batch basis. Despite the general desire to automate kettle operation, there is great inertia in the industry against the changes necessary to automate the production of the calcined product.

There have been systems proposed for automation which have been quite elaborate and expensive. These systems have all included the concept of discharging the calcined product from the kettle bottom through a standpipe, or syphon with its attendant disadvantages. The drawbacks to the so-called tea kettle spout, or syphon, are the need to add extra heat to the spout, and also the need for compressed air jets in the bottom of the kettle to start the product flowing. This has led to plugged up-take pipes, which has aborted the start-up of the continuous kettle.

What is needed is a coordinated control of the feed and discharge from the kettle to produce the product at the proper temperature from the discharge, and to maintain the level of material in the kettle within a range of predetermined values. Further, the discharge in the kettle should be positioned at the same level as the batch operation discharge, and be regulated by a valve responsive to the control factors of kettle operation.

SUMMARY OF THE INVENTION

The present invention contemplates a 3 element control system for continuous operation of a gypsum calcining kettle.

First, the heat input to the kettle is established at the level predetermined to produce the quantity of calcined gypsum output desired. Secondly, the quality of the product is controlled by sensing the temperature desired for the product to regulate the feed of raw gypsum to the kettle. Third, the finished product is drawn from the bottom of the kettle at a rate which will maintain a level of the calcining gypsum in the kettle within a predetermined range. The 3 elements are interdependent within the process, and when controlled, continuously produce the finished product of the desired quality and quantity for so long as fuel to support the heat load and raw gypsum is available to the process in the kettle.

Other objects, advantages and features of the invention will become apparent to one skilled in the art upon consideration of the written specification, appended claims, and accompanying drawing.

DESCRIPTION OF THE DRAWING

The drawing is a sectioned elevation of a furnace and kettle controlled by a system, in which the present invention is embodied.

DESCRIPTION OF THE PREFERRED EMBODIMENT

Batch Operation

The usual gypsum calcining kettle is a suspended stirred tank reactor, in which the chemical reversable decomposition reaction $CaSO_4 \cdot 2H_2O$ (gypsum)$+ \text{heat} = CaSO_4 \cdot \frac{1}{2} H_2O$ (stucco) $+ 3/2\ H_2O$ (steam takes place). The reaction takes place in the solid phase.

This typical kettle is suspended over the firing chamber, which delivers about one million BTU per hour for each ton of stucco produced that hour in the kettle. The hot products of combustion travel a specified path around the kettle shell and through flues in the kettle in order to make most efficient use of the products of combustion.

The normal operation of a batch kettle cycle is first to start the kettle agitator, and then feed fresh, finely ground gypsum into the kettle to a depth of about two feet. The burner in the furnace is then operated and the gypsum is heated to the calcining temperature (about 250° F.). When the calcining temperature is reached, the decomposition reaction occurs and the evolution of steam causes the ground gypsum to be fluidized and appear as a vigorously boiling liquid. Now the kettle is filled at a rate to maintain the calcining temperature, and keep the gypsum in a fluidized state. After the kettle is filled and the temperature begins to slowly rise because of completion of the reaction, the combustion rate is slowly reduced until a desired level is reached about ten minutes before the kettle is to be dumped.

When the proper time arrives, the kettle is dumped, the finished stucco being emptied into a holding bin (hot pit) from which it is conveyed to the processing equipment.

The cycle is then repeated, usually taking 2 to 2½ hours, per batch.

If the kettle operation can be automated, it is generally agreed among those skilled in the art that a 10% savings can be reasonably expected. This 10% increase can be realized by either 10% more production from the same energy requirements, or 10% energy savings from the same production. The present invention enables this goal to be realized.

Continuous Kettle Operation

The drawing illustrates how the calcining kettle can be operated on a continuous basis under the teachings of the invention. The startup procedure for the process parallels that described for the kettle operated on a batch basis.

The level of combustion is set by the operation of the burner. The kettle is to be fed, and products discharged therefrom, at compatible rates to maintain a desired inventory within the kettle. Capacity is controlled by combustion at the burner, which when maintained at a high level will eventually increase the feed of gypsum to the kettle to overcome a temperature increase of calcined gypsum in the kettle. Outlet flow will then be automatically increased to control the increasing level in the kettle. Of course, lowering the operation of the burner will call for less production from the kettle.

To bring this analysis into focus, refer to the drawing. There is depicted a furnace volume 1 formed by refractory walls 2. Burner 3 represents one or more devices for producing products of combustion into furnace volume 1. Products of this combustion flow through the flues 4. On their way to final exit, the products of combustion pass through flues 5 to distribute their heat into the body of calcining gypsum. All of the products of combustion eventually exhaust from exit 6. Thus, the heating process is a rather simple transfer of the heat from the products of combustion through the walls of kettle 7 and flues 5, which are mounted through the walls of kettle 7.

Contents of kettle 7 are maintained in agitation by paddles 8 attached to shaft 9, which is rotated by motor 10. This is the structure by which the gypsum is calcined. By establishing the heat flow into the kettle, and regulating the flow of raw, fresh gypsum into the kettle, and regulating the flow of calcined gypsum from the kettle, the invention enables the kettle to be continuously operated.

The raw, fresh, crushed gypsum is supplied to the kettle through conduit 11, through which raw, fresh, crushed gypsum is introduced into the kettle at a rate set by the operation of auger 12, which is rotated by motor 13. A temperature sensing element 14 is mounted in the lower portion of the kettle 7, where it is sensitive to the temperature to which calcining gypsum has been elevated by the products of combustion. As indicated in the drawing, temperature element 14 is connected to regulate the speed of motor 13, to establish the rate of feed of raw, fresh, crushed gypsum to kettle 7.

With a constant rate of heat input from furnace 1, a temperature element 14 will, in effect, regulate the feed of gypsum to the kettle to maintain the predetermined temperature specified for the calcined product discharged from the kettle.

The calcined gypsum in the lower portion of the kettle 7 is withdrawn through conduit 15. The rate of discharge of calcined gypsum through conduit 15 is established by the setting of valve 16. A level sensing device 17 is mounted within kettle 7 at a position where it will sense the heighth of calcined gypsum in kettle 7. The signal from device 17 is converted into a control signal for valve 16. Therefore, for any predetermined value of level sensed by 17, valve 16 will be adjusted to maintain the rate of discharge for calcined gypsum from the inventory of kettle 7, which will maintain that level.

The overall result including controlling the 3 elements of heat input, temperature of calcined gypsum, level of calcined gypsum, and is to operate kettle 7 continuously for so long as heat is available to furnace 1, and raw gypsum feed is available to kettle 7.

In controlling the feed to kettle 7, the signal from the temperature element 14 must be converted to an electrical signal, which can be imposed upon motor 13. The specific type of element, whether it be a thermocouple, a resistant element, or other form of thermo responsive device, is not an essential element of the invention. Whatever the specific form of this primary element, it will generate a signal, which can be converted into the suitable control signal for motor 13. Conversion is represented by black box 18, between element 14 and motor 13. The concept is to sense when the calcined temperature of approximately 250° F. is reached, and to operate motor 13 and its auger 12 to increase or decrease the feed to maintain the predetermined temperature at 14.

In controlling the discharge of calcined gypsum from the lower portion of kettle 7, conduit 15 is controlled by valve 16. There may be several types of valves suitable for this service. It is contemplated that a simple plate, or knife type valve, which will withstand the temperature of the flowing calcined gypsum effectively. Whatever type of valve is employed at 16, its setting is controlled by primary element 17, which is sensing the level of calcining gypsum in kettle 7. Here again, the specific form of primary element 17 is immaterial. A capacitance probe will sense the level and will operate satisfactorily in this service. Whatever specific type of level sensing device is utilized, its signal must be converted into the hydraulic or pneumatic signal required to position valve 16. Conversion of this signal is represented by black box 19.

Regardless of the specific form of structure selected to control heat input to the system by burner 3, temperature sensing at 14, control of feed in conduit 11, discharged by valve valve 16, and level sensed at 17, continuous, automatic operation is expected under the concepts of the invention. Once an inventory of calcined gypsum is accumulated in kettle 7, and the temperature in the lower portion of the ketted reached, and discharge from the lower portion initiated, calcined gypsum will be produced continuously and be available for the subsequent manufacture of wallboard or plaster. As previously contemplated, this production can be achieved with a significant savings, or significant increase in production, over that possible by batch operation of the same kettle.

From the foregoing, it will be seen that this invention is one well adapted to attain all of the ends and objects hereinabove set forth, together with other advantages which are obvious and inherent to the process.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A control system for operating a gypsum calcining kettle in a continuous manner, including, a furnace in which combustion supplies heat for calcining gypsum, a kettle arranged in a heat exchange relationship with the products of combustion of the furnace combustion, a supply of finely ground raw gypsum, means connecting the supply to the kettle to control the gypsum supplied the kettle, means for sensing the temperature of gypsum supplied and being calcined in the lower portion of the kettle, a discharge conduit connected to the lower portion of the kettle, a valve in the conduit, and means of detecting the level of the calcining gypsum in the kettle and arranged to continuously operate the valve to adjust the position of the valve and regulate the flow of calcined gypsum from the lower portion of the kettle to maintain a level of the gypsum in the kettle within a predetermined range.

2. The control system of claim 1, in which, there is a burner system for the furnace, adapted to establish the level of combustion in the furnace, and therefore, the heat quantity supplied to the kettle.

3. The system of claim 1, wherein, the connecting means between the supply and the kettle includes an auger rotated by a motor to convey and control the gypsum from the supply to the kettle at a rate established by the speed of rotation of the motor, and a connection between the temperature element and the motor controls the speed of the motor.

4. The control system of claim 1, in which, the valve is a knife-type in the outlet conduit of the kettle as the means of continuously regulating the discharge of calcined gypsum from the kettle, and the level sensing means is a capacitance probe generating the signal continuously controlling the valve position.

5. A system with which to continuously produce calcined gypsum, including, a kettle-vessel to receive fresh, crushed gypsum and discharge the gypsum after it has been calcined, a source of heat arranged to continuously supply a predetermined quantity of heat to the kettle contents, a system connected to the kettle arranged to supply fresh, crushed gypsum continuously to the kettle at a controlled rate, a temperature control system connected to the kettle with its primary element arranged to respond to the temperature of the calcining gypsum in the lower portion of the kettle and continuously regulate the rate at which the gypsum is introduced into the kettle, a discharge system connected to the kettle and arranged to continuously draw calcined gypsum from the lower portion of the kettle at a rate determined by the setting of a valve in the discharge conduit of the system, and a level control system connected to the kettle with its primary element responsive to the level of calcining gypsum in the kettle and arranged to continuously regulate the position of the discharge valve in the conduit, whereby the heat supplied at the predetermined rate and the fresh gypsum continuously supplied at the rate established by the predetermined temperature and the calcined gypsum continuously discharged at the rate established by the level control coordinate to produce calcined gypsum continuously so long as heat and fresh gypsum are available as inputs to the kettle.

* * * * *